US005688754A

United States Patent [19]

Drapier

[11] Patent Number: 5,688,754

[45] Date of Patent: Nov. 18, 1997

[54] LIGHT DUTY LIQUID CLEANING COMPOSITIONS

[75] Inventor: Julien Drapier, Seraing, Belgium

[73] Assignee: Colgate-Palmolive Company, Piscataway, N.J.

[21] Appl. No.: 609,317

[22] Filed: Mar. 1, 1996

Related U.S. Application Data

[63] Continuation-in-part of Ser. No. 511,988, Aug. 7, 1995, abandoned, which is a continuation-in-part of Ser. No. 337,541, Nov. 8, 1994, abandoned.

[51] Int. Cl.[6] .............................. C09K 11/00; C11D 3/43; C11D 1/62

[52] U.S. Cl. .......................... 510/218; 510/238; 510/405; 510/426; 510/428; 510/429

[58] Field of Search .................................... 510/242, 405, 510/426, 238, 428, 429, 218

[56] References Cited

U.S. PATENT DOCUMENTS

| | | | |
|---|---|---|---|
| 5,075,026 | 12/1991 | Loth et al. | 252/122 |
| 5,075,954 | 12/1991 | Loth et al. | 252/122 |
| 5,082,584 | 1/1992 | Loth et al. | 252/122 |
| 5,108,643 | 4/1992 | Loth et al. | 952/174.11 |
| 5,350,541 | 9/1994 | Michael et al. | 252/549 |
| 5,387,375 | 2/1995 | Erilli et al. | 252/546 |
| 5,415,813 | 5/1995 | Misselyn et al. | 252/547 |

*Primary Examiner*—Paul Lieberman
*Assistant Examiner*—Necholus Ogden
*Attorney, Agent, or Firm*—Richard E. Nanfeldt

[57] ABSTRACT

A light duty liquid detergent with desirable cleansing properties and mildness to the human skin comprising five essential surfactants: a water soluble nonionic surfactant, a $C_{8-18}$ ethoxylated alkyl ether sulfate anionic surfactant, a $C_{10-20}$ paraffin sodium sulfonate surfactant, an alkyl sulfate surfactant, and a betaine surfactant.

6 Claims, No Drawings

LIGHT DUTY LIQUID CLEANING COMPOSITIONS

RELATED APPLICATION

This application is a continuation in part application of U.S. Ser. No. 8/511,988 filed Aug. 7, 1995 now abandoned which in turn is a continuation in part application of U.S. Ser. No. 8/337,541 filed Nov. 8, 1994 now abandoned.

FIELD OF INVENTION

This invention relates to a light duty liquid cleaning composition which imparts mildness to the skin and is designed in particular for dishware and which is effective in removing grease soil and in leaving unrinsed surfaces with a shiny appearance.

BACKGROUND OF THE INVENTION

In recent years all-purpose liquid detergents have become widely accepted for cleaning hard surfaces, e.g., painted woodwork and panels, tiled walls, wash bowls, bathtubs, linoleum or tile floors, washable wall paper, etc. Such all-purpose liquids comprise clear and opaque aqueous mixtures of water-soluble synthetic organic detergents and water-soluble detergent builder salts. In order to achieve comparable cleaning efficiency with granular or powdered all-purpose cleaning compositions, use of water-soluble inorganic phosphate builder salts was favored in the prior art all-purpose liquids. For example, such early phosphate-containing compositions are described in U.S. Pat. Nos. 2,560,839; 3,234,138; 3,350,319; and British Patent No. 1,223,739.

In view of the environmentalist's efforts to reduce phosphate levels in ground water, improved all-purpose liquids containing reduced concentrations of inorganic phosphate builder salts or non-phosphate builder salts have appeared. A particularly useful self-opacified liquid of the latter type is described in U.S. Pat. No. 4,244,840.

However, these prior art all-purpose liquid detergents containing detergent builder salts or other equivalent tend to leave films, spots or streaks on cleaned unrinsed surfaces, particularly shiny surfaces. Thus, such liquids require thorough rinsing of the cleaned surfaces which is a time-consuming chore for the user.

In order to overcome the foregoing disadvantage of the prior art all-purpose liquid, U.S. Pat. No. 4,017,409 teaches that a mixture of paraffin sulfonate and a reduced concentration of inorganic phosphate builder salt should be employed. However, such compositions are not completely acceptable from an environmental point of view based upon the phosphate content. On the other hand, another alternative to achieving phosphate-free all-purpose liquids has been to use a major proportion of a mixture of anionic and nonionic detergents with minor amounts of glycol ether solvent and organic amine as shown in U.S. Pat. No. 3,935,130. Again, this approach has not been completely satisfactory and the high levels of organic detergents necessary to achieve cleaning cause foaming which, in turn, leads to the need for thorough rinsing which has been found to be undesirable to today's consumers.

Another approach to formulating hard surface or all-purpose liquid detergent composition where product homogeneity and clarity are important considerations involves the formation of oil-in-water (o/w) microemulsions which contain one or more surface-active detergent compounds, a water-immiscible solvent (typically a hydrocarbon solvent), water and a "cosurfactant" compound which provides product stability. By definition, an o/w microemulsion is a spontaneously forming colloidal dispersion of "oil" phase particles having a particle size in the range of about 25 to about 800 Å in a continuous aqueous phase.

In view of the extremely fine particle size of the dispersed oil phase particles, microemulsions are transparent to light and are clear and usually highly stable against phase separation.

Patent disclosures relating to use of grease-removal solvents in o/w microemulsions include, for example, European Patent Applications EP 0137615 and EP 013761 6—Herbots et al; European Patent Application EP 0160762—Johnston et al; and U.S. Pat. No. 4,561,991—Herbots et al. Each of these patent disclosures also teaches using at least 5% by weight of grease-removal solvent.

It also is known from British Patent Application GB 2144763A to Herbots et al, published Mar. 13, 1985, that magnesium salts enhance grease-removal performance of organic grease-removal solvents, such as the terpenes, in o/w microemulsion liquid detergent compositions. The compositions of this invention described by Herbots et al. require at least 5% of the mixture of grease-removal Solvent and magnesium salt and preferably at least 5% of solvent (which may be a mixture of water-immiscible non-polar solvent with a sparingly soluble slightly polar solvent) and at least 0.1% magnesium salt.

However, since the amount of water immiscible and sparingly soluble components which can be present in an o/w microemulsion, with low total active ingredients without impairing the stability of the microemulsion is rather limited (for example, up to about 18% by weight of the aqueous phase), the presence of such high quantities of grease-removal solvent tend to reduce the total amount of greasy or oily soils which can be taken up by and into the microemulsion without causing phase separation.

The present invention relates to novel light duty liquid detergent compositions with high foaming properties, containing a nonionic surfactant, an alkyl sulfate surfactant, a sulfonate surfactant, a betnine surfactant, and an ethoxylated alkyl ether sulfate surfactant.

Nonionic surfactants are in general chemically inert and stable toward pH change and are therefore well suited for mixing and formulation with other materials. The superior performance of nonionic surfactants on the removal of oily soil is well recognized. Nonionic surfactants are also known to be mild to human skin. However, as a class, nonionic surfactants are known to be low or moderate foamers. Consequently, for detergents which require copious and stable foam, the application of nonionic surfactants is limited. There have been substantial interest and efforts to develop a high foaming detergent with substantial amounts of nonionic surfactants. Yet, little has been achieved.

The prior art is replete with light duty liquid detergent compositions containing nonionic surfactants in combination with anionic and/or betaine surfactants wherein the nonionic detergent is not the major active surfactant, as shown in U.S. Pat. No. 3,658,985 wherein an anionic based shampoo contains a minor amount of a fatty acid alkanolamide. U.S. Pat. No. 3,769,398 discloses a betaine-based shampoo containing minor amounts of nonionic surfactants. This patent states that the low foaming properties of nonionic detergents renders its use in shampoo compositions non-preferred. U.S. Pat. No. 4,329,335 also discloses a shampoo containing a betaine surfactant as the major ingredient and minor amounts of a nonionic surfactant and of a fatty acid mono- or di-ethanolamide. U.S. Pat. No. 4,259,204 discloses a shampoo comprising 0.8–20% by weight of an anionic phosphoric acid ester and one additional surfactant which may be either anionic, amphoteric, or nonionic. U.S. Pat. No. 4,329,334 discloses an anionic-amphoteric based shampoo containing a major amount of anionic surfactant and lesser amounts of a betaine and nonionic surfactants.

U.S. Pat. No. 3,935,129 discloses a liquid cleaning composition based on the alkali metal silicate content and containing five basic ingredients, namely, urea, glycerin, triethanolamine, an anionic detergent and a nonionic detergent. The silicate content determines the amount of anionic and/or nonionic detergent in the liquid cleaning composition. However, the foaming property of these detergent compositions is not discussed therein.

U.S. Pat. No. 4,129,515 discloses a heavy duty liquid detergent for laundering fabrics comprising a mixture of substantially equal amounts of anionic and nonionic surfactants, alkanolamines and magnesium salts, and, optionally, zwitterionic surfactants as suds modifiers.

U.S. Pat. No. 4,224,195 discloses an aqueous detergent composition for laundering socks or stockings comprising a specific group of nonionic detergents, namely, an ethylene oxide of a secondary alcohol, a specific group of anionic detergents, namely, a sulfuric ester salt of an ethylene oxide adduct of a secondary alcohol, and an amphoteric surfactant which may be a betaine, wherein either the anionic or nonionic surfactant may be the major ingredient.

The prior art also discloses detergent compositions containing all nonionic surfactants as shown in U.S. Pat. Nos. 4,154,706 and 4,329,336 wherein the shampoo compositions contain a plurality of particular nonionic surfactants in order to effect desirable foaming and detersive properties despite the fact that nonionic surfactants are usually deficient in such properties.

U.S. Pat. No. 4,013,787 discloses a piperazine based polymer in conditioning and shampoo compositions which may contain all nonionic surfactant or all anionic surfactant.

U.S. Pat. No. 4,671,895 teaches a liquid detergent composition containing an alcohol sulfate surfactant, a nonionic surfactant, a paraffin sulfonate surfactant, an alkyl ether sulfate surfactant and water.

U.S. Pat. No. 4,450,091 discloses high viscosity shampoo compositions containing a blend of an amphoteric betaine surfactant, a polyoxybutylene polyoxyethylene nonionic detergent, an anionic surfactant, a fatty acid alkanolamide and a polyoxyalkylene glycol fatty ester. But, none of the exemplified compositions contains an active ingredient mixture wherein the nonionic detergent is present in major proportion, probably due to the low foaming properties of the polyoxybutylene polyoxyethylene nonionic detergent.

U.S. Pat. No. 4,595,526 describes a composition comprising a nonionic surfactant, a betaine surfactant, an anionic surfactant and a $C_{12}$–$C_{14}$ fatty acid monethanolamide foam stabilizer.

However, none of the above-cited patents discloses a liquid detergent composition containing a nonionic surfactant, a high foaming anionic sulfonate surfactant, an alkyl sulfate surfactant, a betaine surfactant, and an ethoxylated alkyl ether sulfate surfactant as the essential ingredients, and the composition does not contain any HEDTA, choline chloride, amine oxide, abrasives, silicas, alkaline earth metal carbonates, alkyl glycine surfactant, cyclic imidinium surfactant, alkali metal carbonates or more than 3 wt. % of a fatty acid or its salt thereof or more than 0.25 wt. of a perfume and the composition is not a microemulsion.

SUMMARY OF THE INVENTION

It has now been found that a light duty liquid composition can be formulated with a nonionic surfactant which has desirable cleaning properties, mildness to the human skin.

An object of this invention is to provide a novel light duty liquid detergent composition containing a nonionic surfactant, an alkyl sulfate surfactant, a betaine surfactant, a sulfonate surfactant and an ethoxylated alkyl ether sulfate surfactant, wherein the composition does not contain any amine oxide, silicas, abrasives, alkali metal carbonates, alkaline earth metal carbonates, alkyl glycine surfactant, cyclic imidinium surfactant, or more than 3 wt. % of a fatty acid or salt thereof.

Another object of this invention is to provide a novel light duty liquid detergent with desirable high foaming and cleaning properties which is mild to the human skin.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein the novel, high foaming light duty liquid detergent of this invention comprises five essential surfactants: a water soluble ethoxylated nonionic surfactant, a betaine surfactant, an ethoxylated alkyl ether sulfate surfactant, an alkyl sulfate anionic surfactant, and a sulfonate artionic surfactant, wherein the composition does not contain any choline, chloride, amine oxide, silicas, abrasives, alkali metal carbonates, alkaline earth metal carbonates, alkyl glycine surfactant, cyclic imidinium surfactant or more than 3 wt. % of a fatty acid or salt thereof or more than 0.25 wt. % of a perfume and the composition is not an emulsion or microemulsion.

DETAILED DESCRIPTION OF THE INVENTION

The light duty liquid compositions of the instant invention comprise approximately by weight:

(a) 10% to 17% of an alkali metal salt of a $C_{12-18}$ paraffin sulfonate;

(b) 3% to 8% of an alkali metal or ammonium salt of a $C_{8-18}$ ethoxylated alkyl ether sulfate;

(c) 3% to 6% of a betaine surfactant;

(d) 10% to 14% of a nonionic surfactant;

(e) 0.1% to 12% of at least one solubilizing agent;

(f) 2% to 5% of an alkyl sulfate surfactant;

(g) 0.1% to 10% of a supplemental solubilizing agent; and (h) the balance being water.

The nonionic surfactant is present in amounts of about 10 to 14%, preferably 11% to 12% by weight of the composition and provides superior performance in the removal of oily soil and mildness to human skin.

The water soluble nonionic surfactants utilized in this invention are commercially well known and include the primary aliphatic alcohol ethoxylates, secondary aliphatic alcohol ethoxylates, alkylphenol ethoxylates and ethylene-oxide-propylene oxide condensates on primary alkanols, such a Plurafacs (BASF) and condensates of ethylene oxide with sorbitan fatty acid esters such as the Tweens (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic surfactant class includes the condensation products of a higher alcohol (e.g., an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

A preferred group of the foregoing nonionic surfactants are the Neodol ethoxylates (Shell Co.), which are higher aliphatic, primary alcohol containing about 9–15 carbon atoms, such as $C_9$–$C_{11}$ alkanol condensed with 7 to 10 moles of ethylene oxide (Neodol 91-8), $C_{12-13}$ alkanol condensed with 6.5 moles ethylene oxide (Neodol 23-6.5), $C_{12-15}$ alkanol condensed with 12 moles ethylene oxide (Neodol 25-12), $C_{14-15}$ alkanol condensed with 13 moles ethylene oxide (Neodol 45-13), and the like. Such ethoxamers have an HLB (hydrophobic lipophilic balance) value of about 8 to 15 and give good O/W emulsification, whereas ethoxamers with HLB values below 8 contain less than 5 ethyleneoxide groups and tend to be poor emulsifiers and poor detergents.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type are $C_{11}$–$C_{15}$ secondary alkanol condensed with either 9 EO (Tergitol 15-S-9) or 12 EO (Tergitol 15-S-12) marketed by Union Carbide.

Other suitable nonionic surfactants include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl phenol condensed with about 9.5 moles of EO per mole of nonyl phenol, dinonyl phenol condensed with about 12 moles of EO per mole of phenol, dinonyl phenol condensed with about 15 moles of EO per mole of phenol and di-isoctylphenol condensed with about 15 moles of EO per mole of phenol. Commercially available nonionic surfactants of this type include Igepal CO-630 (nonyl phenol ethoxylate) marketed by GAF Corporation.

Also among the satisfactory nonionic surfactants are the water-soluble condensation products of a $C_8$–$C_{20}$ alkanol with a hereric mixture of ethylene oxide and propylene oxide wherein the weight ratio of ethylene oxide to propylene oxide is from 2.5:1 to 4:1, preferably 2.8:1 to 3.3:1, with the total of the ethylene oxide and propylene oxide (including the terminal ethanol or propanol group) being from 60–85%, preferably 70–80%, by weight. Such detergents are commercially available from BASF-Wyandotte and a particularly preferred detergent is a $C_{10}$–$C_{16}$ alkanol condensate with ethylene oxide and propylene oxide, the weight ratio of ethylene oxide to propylene oxide being 3:1 and the total alkoxy content being about 75% by weight.

Condensates of 2 to 30 moles of ethylene oxide with sorbitan mono- and tri-$C_{10}$–$C_{20}$ alkanoic acid esters having a HLB of 8 to 15 also may be employed as the nonionic detergent ingredient in the described composition. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Other suitable water-soluble nonionic surfactants are marketed under the trade name "Pluronics." The compounds are formed by condensing ethylene oxide with a hydrophobic base formed by the condensation of propylene oxide with propylene glycol. The molecular weight of the hydrophobic portion of the molecule is of the order of 950 to 4000 and preferably 200 to 2,500. The addition of polyoxyethylene radicals to the hydrophobic portion tends to increase the solubility of the molecule as a whole so as to make the surfactant water-soluble. The molecular weight of the block polymers varies from 1,000 to 15,000 and the polyethylene oxide content may comprise 20% to 80% by weight. Preferably, these surfactants will be in liquid form and satisfactory surfactants are available as grades L 62 and L 64.

The anionic sulfonate surfactants which are used in the detergent of this invention are water soluble such as triethanolamine salts or the sodium, potassium, ammonium and ethanol ammonium salts of linear $C_8$–$C_{16}$ alkyl benzene sulfonates; $C_{10}$–$C_{20}$ paraffin sulfonates and alpha olefin sulfonates containing about 10–24 carbon atoms. The preferred anionic sulfonate surfactant is a sodium salt of a $C_{12-18}$ paraffin sulfonate present in the composition at a concentration of about 10% to 17 wt. %, more preferably 12% to 15%.

The paraffin sulfonates may be monosulfonates or di-sulfonates and usually are mixtures thereof, obtained by sulfonating paraffins of 10 to 20 carbon atoms. Preferred paraffin sulfonates are those of $C_{12-18}$ carbon atoms chains, and more preferably they are of $C_{14-17}$ chains. Paraffin sulfonates that have the sulfonate group(s) distributed along the paraffin chain are described in U.S. Pat. Nos. 2,503,280; 2,507,088; 3,260,744; and 3,372,188; and also in German Patent 735,096. Such compounds may be made to specifications and desirably the content of paraffin sulfonates outside the $C_{14-17}$ range will be minor and will be minimized, as will be any contents of di- or poly-sulfonates.

Examples of suitable other sulfonated artionic surfactants are the well known higher alkyl mononuclear aromatic sulfonates, such as the higher alkylbenzene sulfonates containing 9 to 18 or preferably 9 to 17 carbon atoms in the higher alkyl group in a straight or branched chain, or $C_{8-15}$ alkyl toluene sulfonates. A preferred alkylbenzene sulfonate is a linear alkylbenzene sulfonate having a higher content of 3-phenyl (or higher) isomers and a correspondingly lower content (well below 50%) of 2-phenyl (or lower) isomers, such as those sulfonates wherein the benzene ring is attached mostly at the 3 or higher (for example 4, 5, 6 or 7) position of the alkyl group and the content of the isomers in which the benzene ring is attached in the 2 or 1 position is correspondingly low. Preferred materials are set forth in U.S. Pat. No. 3,320,174, especially those in which the alkyls are of 10 to 13 carbon atoms.

The $C_{8-18}$ ethoxylated alkyl ether sulfate surfactants used in the instant composition have the structure $$R—(OCHCH_2)_nOSO^-_3{}^{M+}$$

wherein n is about 1 to about 22 more preferably 1 to 3 and R is an alkyl group having about 8 to about 18 carbon atoms, more preferably 12 to 15 and natural cuts, for example, $C_{12-14}$; $C_{12-15}$ and M is an ammonium cation or a metal cation, most preferably sodium and m is never magnesium or calcium cation. The ethoxylated alkyl ether sulfate is present in the composition at a concentration of about 3 to about 8 wt. more preferably about 3.5% to 5.5 wt. %.

The ethoxylated alkyl ether sulfate may be made by sulfating the condensation product of ethylene oxide and C8–10 alkanol, and neutralizing the resultant product. The ethoxylated alkyl ether sulfates differ from one another in the number of carbon atoms in the alcohols and in the number of moles of ethylene oxide reacted with one mole of such alcohol. Preferred ethoxylated alkyl ether polyethenoxy sulfates contain 12 to 15 carbon atoms in the alcohols and in the alkyl groups thereof, e.g., sodium myristyl (3 EO) sulfate.

Ethoxylated $C_{8-18}$ alkylphenyl ether sulfates containing from 2 to 6 moles of ethylene oxide in the molecule are also suitable for use in the invention compositions. These detergents can be prepared by reacting an alkyl phenol with 2 to 6 moles of ethylene oxide and sulfating and neutralizing the resultant ethoxylated alkylphenol. The concentration of the ethoxylated alkyl ether sulfate surfactant is about 1 to about 8 wt.

Examples of satisfactory anionic sulfate surfactants used in the instant composition are the alkali metal or ammonium salts of $C_8$–$C_{18}$ alkyl sulfate salts. The alkyl sulfates may be obtained by sulfating the alcohols obtained by reducing glycerides of coconut oil or tallow or mixtures thereof and neutralizing the results product.

The water-soluble zwitterionic surfactant (betaine), which is also an essential ingredient of present light duty liquid detergent composition, constitutes about 3% to 6%, preferably 3% to 5%, by weight and provides good foaming properties and mildness to the present nonionic based liquid detergent. The zwitterionic surfactant is a water soluble betaine having the general formula:

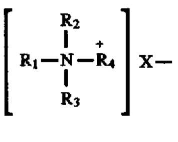

wherein X is selected from the group consisting of $CO_2^-$ and $SO_3^-$ and wherein $R_1$ is an alkyl group having 10 to about 20 carbon atoms, preferably 12 to 16 carbon atoms, or the amido radical:

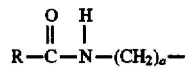

wherein R is an alkyl group having about 9 to 19 carbon atoms and a is the integer 1 to 4; $R_2$ and $R_3$ are each alkyl groups having 1 to 3 carbons and preferably 1 carbon; $R_4$ is an alkylene or hydroxyalkylene group having from 1 to 4 carbon atoms and, optionally, one hydroxyl group. Typical alkyldimethyl betaines include decyl dimethyl betaine or 2-(N-decyl-N, N-dimethyl-ammonia) acetate, coco dimethyl betnine or 2-(N-coco N, N-dimethylammonia) acetate, myristyl dimethyl betaine, palmityl dimethyl betaine, lauryl dimethyl betaine, cetyl dimethyl betaine, stearyl dimethyl betaine, etc. The amidobetaines similarly include cocoamidoethylbetaine, cocoamidopropyl betaine and the like. A preferred betaine is coco ($C_8$–$C_{18}$) amidopropyl dimethyl betaine.

The instant compositions contain about 0.1 wt. % to about 12 wt. %, more preferably about 1 wt. % to about 10 wt. %, of at least one solubilizing agent which can $C_{2-3}$ mono or dihydroxy alkanols such as ethanol, isopropanol and propylene glycol and mixtures thereof. The solubilizing agents are included in order to control low temperature cloud clear properties. Urea is employed in the instant composition as a supplemental solubilizing agent at a concentration of 0.1 to about 10 wt. %, more preferably about 0.5 wt. % to about 8 wt. %.

Other solubilizing agents are glycerol, water-soluble polyethylene glycols having a molecular weight of 300 to 600, polypropylene glycol of the formula $HO(CH_3CHCH_2O)_nH$ wherein n is a number from 2 to 18, mixtures of polyethylene glycol and polypropylene glycol (Synalox) and mono $C_1$–$C_6$ alkyl ethers and esters of ethylene glycol and propylene glycol having the structural formulas $R(X)_nOH$ and $R_1(X)_nOH$ wherein R is $C_1$–$C_6$ alkyl group, $R_1$ is $C_2$–$C_4$ acyl group, X is $(OCH_2CH_2)$ or $(OCH_2(CH_3)CH)$ and n is a number from 1 to 4.

Representative members of the polypropylene glycol include dipropylene glycol and polypropylene glycol having a molecular weight of 200 to 1000, e.g., polypropylene glycol 400. Other satisfactory glycol ethers are ethylene glycol monobutyl ether (butyl cellosolve), diethylene glycol monobutyl ether (butyl carbitol), triethylene glycol monobutyl ether, mono, di, tri propylene glycol monobutyl ether, tetraethylene glycol monobutyl ether, mono, di, tripropylene glycol monomethyl ether, propylene glycol monomethyl ether, ethylene glycol monohexyl ether, diethylene glycol monohexyl ether, propylene glycol tertiary butyl ether, ethylene glycol monoethyl ether, ethylene glycol monomethyl ether, ethylene glycol monopropyl ether, ethylene glycol monopentyl ether, diethylene glycol monomethyl ether, diethylene glycol monoethyl ether, diethylene glycol monopropyl ether, diethylene glycol monopentyl ether, triethylene glycol monomethyl ether, triethylene glycol monoethyl ether, triethylene glycol monopropyl ether, triethylene glycol monopentyl ether, triethylene glycol monohexyl ether, mono, di, tripropylene glycol monoethyl ether, mono, di tripropylene glycol monopropyl ether, mono, di, tripropylene glycol monopentyl ether, mono, di, tripropylene glycol monohexyl ether, mono, di, tributylene glycol mono methyl ether, mono, di, tributylene glycol monoethyl ether, mono, di, tributylene glycol monopropyl ether, mono, di, tributylene glycol monobutyl ether, mono, di, tributylene glycol monopentyl ether and mono, di, tributylene glycol monohexyl ether, ethylene glycol monoacetate and dipropylene glycol propionate.

The instant invention can also contain 0 to about 5 wt. %, more preferably about 0.5 wt. % to about 4.0 wt. % of a $C_{12-14}$ monoethanol amide (LMMEA) and 0 to about 3 wt. %, more preferably about 0.3 wt. % to about 24 wt. % of a water hydrotropic salt such as an alkali metal such as sodium, potassium or ammonium salt of a $C_{1-3}$ substituted benzene sulfonate such as xylene sulfonate or cumene sulfonate and mixtures thereof.

The instant formulas explicitly exclude alkali metal silicates and alkali metal builders such as alkali metal polyphosphates, alkali metal carbonates, alkali metal phosphonates and alkali metal citrates because these materials, if used in the instant composition, would cause the composition to have a high pH as well as leaving residue on the surface being cleaned. The instant compositions can contain from 0 to 0.25 wt. % of a perfume. The final essential ingredient in the inventive compositions having improved interfacial tension properties is water.

In final form, the instant compositions exhibit stability at reduced and increased temperatures. The instant compositions are homogenous solutions, wherein all the ingredients are dissolved in the water. The instant compositions are not microemulsions or emulsions both of which are explicitly excluded from the instant invention. Additionally, the instant inventions do not contain a grease release agent such as choline chloride. More specifically, such compositions remain clear and stable in the range of 5° C. to 50° C., especially 10° C. to 43° C. The instant compositions have a light transmission of at least 95%. Such compositions exhibit a pH of 5 to 8. The liquid compositions are readily pourable and exhibit a viscosity in the range of 100 to 400 cps as measured at 25° C. with a Brookfield RVT Viscometer using a #2 spindle rotating at 30 RPM. Preferably, the viscosity is maintained in the range of 150 to 300 cps. The instant compositions have a minimum foam height of 150 mls after 55 rotation at 40° C. as measured by the foam volume test using 0.75 grams of the composition per liter of water and 10 grams of corn oil per liter of water having a hardness of 300 ppm.

The following examples illustrate liquid cleaning compositions of the described invention. Unless otherwise specified, all percentages are by weight. The exemplified compositions are illustrative only and do not limit the scope of the invention. Unless otherwise specified, the proportions in the examples and elsewhere in the specification are by weight.

EXAMPLE 1

The following composition in wt. % was prepared by simple mixing procedure:

-continued

| | |
|---|---|
| $C_9$–$C_{11}$ alcohol 7.5–8:1 | 11.6 |
| Lauryl alkyl dimethyl betaine | 3.0 |
| $C_{12}$–$C_{14}$ alcohol EO 2:1 Na sulfate | 4.3 |
| Na $C_{14-17}$ paraffin sulfonate | 13.7 |
| LMMEA | 2.0 |
| Sodium xylene sulfonate blend | 1.2 |
| Ammonium lauryl sulfate | 3.4 |
| Perfume | 0.25 |
| Water | Balance |
| Brookfield viscosity (a) | 225 cps |
| Suds titration (b) | 5.6 |
| Hand dishwashing with mixed soil (c) | 16 |
| Foam volume at 55 rotations at 25° C. | 190 ml |

(a) Brookfield LVT with sp #2 at 30 rpm (at 25° C.)
(b) Crisco soil loading (in grams) required to reduce the suds of a test solution to a defined minimum under standard conditions of washing bath concentration, agitation, temperature and water hardness.
(c) The mixed soil is a mixture of olive oil, lard, flour and milk powder.

What is claimed:

1. A clear light duty liquid cleaning composition which consisting essentially of approximately by weight:

(a) 12% to 15% of an alkali metal salt of a $C_{12-18}$ paraffin sulfonate;

(b) 3% and 5% of an alkali metal salt of a $C_{8-18}$ ethoxylated alkyl ether sulfate;

(c) 3% to 5% of a betaine surfactant;

(d) 11% to 12% of a nonionic surfactant;

(e) 0to 12% of at least one solubilizing agent;

(f) 2% to 5% of an ammonium salt of an alkyl sulfate surfactant;

(g) 0 to 10% of a supplemental solubilizing agent; and (h) the balance being water, said composition having a minimum foam height of 150 mls after 55 rotations at 40° C. as measured by a foam volume test using 0.75 grams of said composition per liter of water having a hardness of 300 ppm and 10 grams of corn oil per liter of said water having said hardness of 300 ppm; and wherein said composition does not contain any choline or more than 0.25 wt. % of a perfume and is not a microemulsion.

2. The composition of claim 1, wherein said solubilizing agent which is a $C_{2-4}$ mono or dihydroxy alkanol.

3. The composition of claim 1, wherein said solubilizing agent is selected from the group consisting of isopropanol, ethanol and propylene glycol and mixtures thereof.

4. The composition of claim 1, wherein said solubilizing agent is selected from the group consisting of glycerol, polyethylene glycols, polypropylene glycol of the formula $HO(CH_3)CHCH_2O)_nH$, wherein n is 2 to 18, mono $C_1$–$C_6$ alkyl ethers and esters of ethylene glycol and propylene glycol having the formulas of $R(X)_nOH$ and $R_1(X)_nOH$ wherein R is a $C_{1-6}$ alkyl group, $R_1$ is $C_{2-4}$ acyl group, X is $(OCH_2CH_2)$ or $(OCH_2CHCH_3)$ and n is from 1 to 4.

5. The composition of claim 1, wherein said solubilizing agent is dipropylene glycol monomethyl ether.

6. The composition of claim 1 wherein said solubilizing agent is a mixture of a $C_{12-14}$ monoethanol amide and an alkali metal salt of a $C_{1-3}$ substituted benzene sulfonate.

* * * * *